Oct. 14, 1941.   E. WILLIAMS ET AL   2,259,282

MOLDING MEANS FOR CABLE JOINTS AND THE LIKE

Filed Feb. 15, 1941   5 Sheets-Sheet 3

INVENTORS
CONSTANTINE P. XENIS
ERNEST WILLIAMS
BY
Ward, Crosby & Neal
ATTORNEYS

Patented Oct. 14, 1941

2,259,282

UNITED STATES PATENT OFFICE 2,259,282

MOLDING MEANS FOR CABLE JOINTS AND THE LIKE

Ernest Williams, Jackson Heights, and Constantine P. Xenis, Little Neck, N. Y., assignors to Consolidated Edison Company of New York, Inc., New York, N. Y., a corporation of New York Application February 15, 1941, Serial No. 379,016

12 Claims. (Cl. 22—116)

This invention relates to molding means for forming improved cable joints and is particularly applicable to joints in electric power cables and electrical communication wire cables of the types enclosed in lead or other metallic sheaths.

This application is a continuation in part of our copending application Ser. No. 304,567 filed November 15, 1939. Certain alternative forms of joints for which this invention may be used are disclosed and claimed in our copending application Ser. No. 379,017 filed concurrently herewith and entitled "Cable joint construction."

Joint constructions for lead covered cables and the like are customarily covered, protected and strengthened by a lead or other metallic sleeve enclosing the spliced portions of such cables. For many years it has been the practice to effect a seal between the ends of such sleeves and the cable sheaths by "beating in" the ends of the sleeve to an extent such that the peripheral edges contact with the cable sheath, and then the region at the end of the sleeve is "wiped" by hand with solder chilled to plasticity. Such wiping operation has to be performed by skilled workmen who have gone through a considerable period of training if the occurrence of leaky or porous "wipes" is to be avoided, even with cables of relatively small size. However, with the use of cables of larger size requiring larger wipes, and particularly with complicated joints or where two or more cables enter the sleeve at one end of the joint, there is great difficulty in securing reliable wipes and only a small portion of the more skillful and experienced workmen trained in this art are able to accomplish the task, and sometimes the operations fail and have to be repeated before successfully completed.

In performing the wiping operations, solder is melted in a pot, and then poured by the use of a hand ladle on to the area of the desired wipe. A portion of the solder thus poured adheres in plastic condition to the cable sheath or the sleeve, provided the poured solder is at the proper temperature, and the remainder is received in a wiping pad held in the hand of the operative just beneath the cable. This pouring operation is repeated again and again, while the pad with solder thereon must be skillfully wiped over the area of the desired seal until a sufficient mass of plastic solder is built up to form a poultice-like seal between the sleeve and the cable sheath. The difficulties with this method arise from various causes. If the solder is too hot or if too much solder is poured on to one area, either the sleeve or cable sheath will be "burned" quickly through, that is, a hole will be melted through, ruining the joint or the cable. Also, particularly with the larger joints, if the plastic mass of solder as it accumulates on the joint is slightly too soft, it may collapse and fall away, requiring the operative to start anew. Again, if the mass of solder solidifies before a smooth continuous wipe has been formed, crevices and irregularities will occur impairing the strength and durability of the seal or affording areas prone to leakage. While such an imperfect joint sometimes might be corrected by applying a blow torch, the use of open flames in underground manholes or passages offers a hazard from gas explosions and is therefore generally prohibited. There is a relatively narrow temperature range of plasticity required of the solder to permit sufficient workability and this necessitates skillful timing of the operations in forming the wipe. Solder with 40% tin and 60% lead as normally used for this type of work, has a plastic range of approximately 55° C., or from about 238° C. down to 183° C., the latter temperature being the solidifying point of the eutectic mixture (63% tin and 37% lead). In the wiping process as the solder is cooled to a plastic workability, there is a solidification of lead particles or crystals at temperatures above 183° C., the solidifying point of the eutectic mixture. Yet due to the fact that the eutectic mixture remains liquid down to 183° C., it tends to run out of or to the bottom of the mass being formed, leaving the wipe coarse or porous toward the top. This effect is particularly pronounced in larger wipes. For example, it has been found very difficult to secure reliable non-porous wipes on the larger cables without resorting to the hazardous glazing process.

Further disadvantages of the customary wiping process reside in the following facts. The necessity of maintaining a pot of the molten metal at hand, particularly in confined spaces during underground work, is a dangerous hazard, as is also the ladling and pouring of such metal. The operatives are frequently seriously burned. The "beating in" of the sleeve for complicated joints requires much time, and skilled work. Often supplemental end parts must be formed and fitted, on the job, between a plurality of cables. The wiping operation for each large joint requires the services of the skilled operative for several hours even if the operations do not have to be repeated. And the quality and useful life of the resulting joint often depend largely upon chance or the skill of the workman.

While efforts have been made for years to provide some method of avoiding the above difficulties and hazards, so far as we are aware such efforts have not, prior to our inventions, produced any substitute method or construction which has gone into any substantial practical use in replacement of the manual wiping operation.

The objects of this invention include the provision of novel molding apparatus for forming the improved joint constructions, which will avoid in practice, the above-mentioned difficulties and make possible the formation of more dependable and uniformly satisfactory seals, with a substantial saving of time and without requiring the operative to have any high degree of skill or long experience. Various features of the invention are also applicable to the problem of sealing metallic sheathed cables within terminal bushings or the like, for example at points where the cables enter a transformer or other piece of electrical equipment. Also the molding means of this invention are adaptable to the forming of end sealing caps or plugs upon cables which are not in use and for the sealing of pulling eyelets or bolts into the ends of cables in preparation for pulling the same into conduits.

Various further and more specific objects, features and advantages will clearly appear from the detailed description given below taken in connection with the accompanying drawings which form a part of this specification and illustrate merely by way of example preferred forms of the invention. The invention consists in such novel features, arrangements and combinations of parts as may be shown and described in connection with the constructions herein disclosed.

Figures 1, 2, 3, 3A, 4, 5:
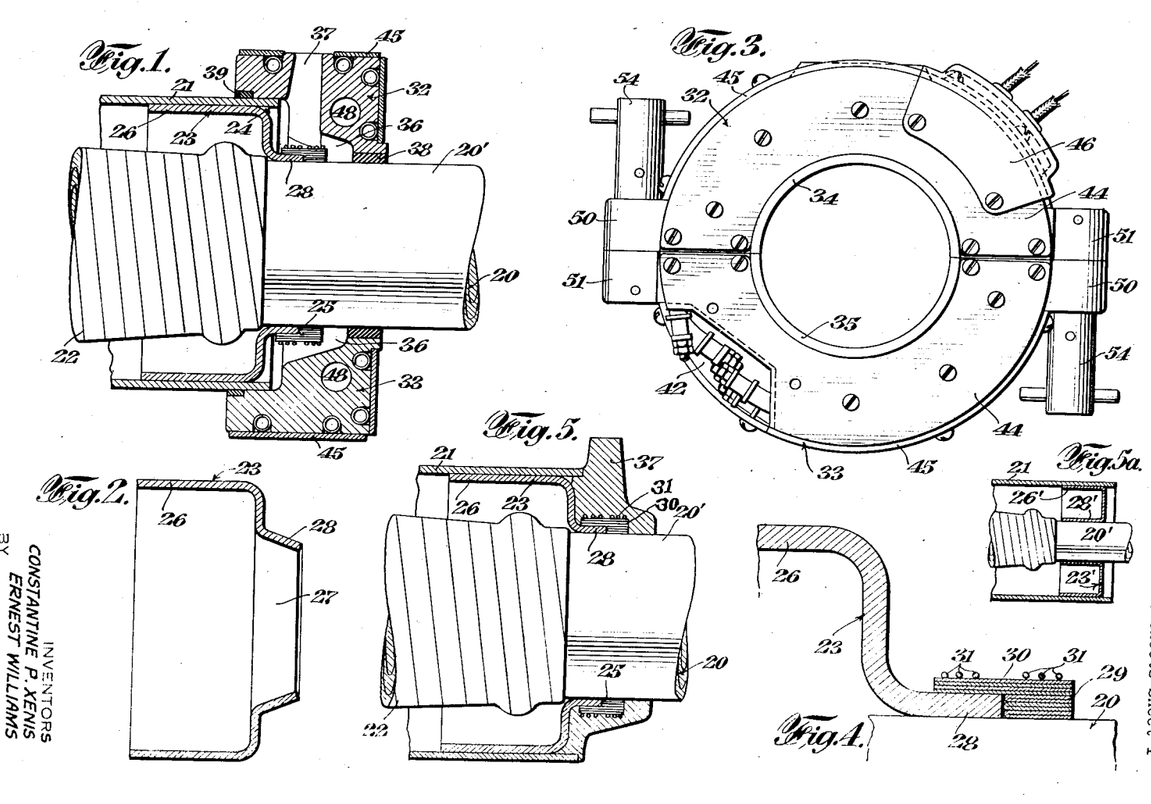
Fig. 1 is a longitudinal sectional view of an end portion of a cable joint or terminal with molding means according to the invention applied thereto ready for forming a solder seal.
Fig. 2 is a sectional view of a typical barrier member for forming the inner part of the molding means as of Fig. 1; this figure showing the barrier as of a preferred shape before it is fitted to the cable.
Fig. 3 is an end view of the assembly as shown in Fig. 1.
Fig. 4 is an enlarged detailed sectional view illustrating a preferred method of sealing and securing the inner flange or lip of the barrier means as of Fig. 2, in respect to a cable sheath.
Fig. 5 is a longitudinal sectional view of a completed sealed end portion of a cable joint, as formed with the molding arrangement of Fig. 1.

Referring now to Fig. 1, a cable 20 is shown entering the end of a lead or other metallic sleeve 21, for enclosing an insulated conductor joint or terminal connection as at 22. The cable may comprise a high or low voltage power cable with or without oil under pressure therein, or may be for telephone, telegraph or other communication purposes. Such cables will ordinarily be contained in a metal sheath, usually of lead, as at 20'. The insulated conductor joint 22 may be formed in accordance with suitable well-known methods, and the containing sleeve 21, after its end is sealed as hereinafter described, is adapted to be filled with oil or other insulating fluid or composition in accordance with well-known practice.

Before the conductor joint 22 is made, the cable 20 may be run through the members 21 and 23, these members being slid back on the cable out of the way during the steps of forming and insulating the conductor joint. The edge surfaces and adjacent inner surfaces at the end of the sleeve 21 and the outside surfaces at the end of the cable sheath are scraped clean and coated with stearin or other flux material; then after the insulation windings at 22 are completed, the sleeve 21 and barrier member 23 are slid into place as shown. To retain the barrier and sleeve in their proper positions during the subsequent operations, the barrier may be tacked with solder at spaced points as at 24 to the sleeve, and as at 25 to the cable sheath.

The barrier member 23 as shown in Fig. 2, may initially comprise a disc-like member of sheet lead with an extended peripheral flange as at 26 pressed therefrom and designed to extend inwardly of the joint for a considerable distance in contact with the inside walls of the lead sleeve 21, so that when molten solder is applied to the outside surface of the barrier for sealing the joint, any solder which may tend to leak inwardly along the inside surface of the sleeve will have opportunity to become cool and solidify, thereby preventing leakage of solder into the joint past the flange 26. The central area of the barrier member 23 may be apertured as at 27 to permit passage of the cable therethrough. The inner walls of the aperture as shown are preferably shaped with a generally conical flange extending outwardly of the joint so that the more constricted portion 28 of this flange may closely embrace the cable sheath at a readily accessible point outside the end of the sleeve 21.

The external dimensions of lead cable sheaths of various specified sizes, often do not accurately conform to the dimensions specified. Consequently in order to insure that the apertured barriers will closely fit the cable sheath, it is generally necessary to provide for varying the aperture size on each job. This may be readily accomplished with the construction shown, by forming the constricted portion 28 with a diameter small enough to insure a close fit with the smallest cable intended to pass therethrough, and for slightly larger cables the constricted portion may be reamed, or expanded somewhat as by a conically shaped tool. As indicated in Fig. 1, the more constricted portion 28 has been expanded at least for a short distance along its length, to substantially a cylindrical shape, in order to closely fit the particular cable shown at 20.

In order to prevent leakage of solder past the flanged or lip portion 28 into the joint, it may be wrapped with suitable windings for binding it in sealing relationship with the cable sheath. For example, as shown in Fig. 4 a number of layers of tape as at 29 folded lengthwise to form a double thickness, may first be wrapped tightly around the cable sheath adjacent the edge of the portion 28, and with a number of turns sufficient to form a thickness about equal to the thickness of said portion. Then the remainder of this tape may be unfolded to its full width as at 30, and the wrapping continued for several turns extending over both the portion 28 and the double layers 29. The tape used for this purpose should preferably be formed of material which will not be attacked by oil from within the cable; also of a material which will not tend to injure the quality of the oil in the joint even after contact therewith for a long period of time. For example, tape woven from fine spun glass, asbestos or the like, all of which we shall refer to as "mineral wool," may be satisfactorily used. The layers of tape may be tied or bound in place with spun glass roving or other suitable typing material, as at 31, formed either as a continuation of the tape material or if preferred, as a separate strand. Also if preferred, suitable coil spring wire may be used for the windings 31.

A removable mold formed of complementary sections as at 32, 33, may be next applied. Each of these mold sections may be formed with semicircular cutout portions as at 34, 35 for receiving and embracing the cable (Fig. 3). The rear faces of the mold sections are shaped as shown in Fig. 1, to embrace the outside of the end of the sleeve 21. Internally the mold sections are so shaped as to provide a cavity 36 within which the solder is cast to form a wall-like end piece integrally sealed at its periphery to the edges of the sleeve 21, and integrally sealed at its mid portion to the outside surface of the cable sheath. The upper mold section 32 may also be formed with a gate opening or sprue as at 37 communicating with the cavity 36.

As shown in Fig. 5, the completed solder seal not only integrally joins the cable sheath 20' and sleeve 21, but also the annular outer wall portion of the lead barrier 23, the solder further covering and protecting the windings 29, 30, 31. Also it will be noted that with the mold cavity formed as shown in Fig. 1, a considerable wall thickness of solder will be provided within the end of the sleeve 21, and therefore in a position to afford mutual support between the sleeve end edges and the cable sheath, giving a rigid unitary construction capable of withstanding substantial internal pressures, as well as withstanding mechanical shocks and repeated expansion and contraction forces in the cables. Also a part of this solder wall extends out at its periphery so as to cover and protect the end edges of the sleeve 21, and at the same time preventing any danger that the end wall may be dislodged inwardly of the joint. It will be noted that the cavity 36 includes a generally conical extension into which the barrier flange 28 and its windings may protrude in spaced relation to the walls of the cavity. Thus the cable as it emerges from the finished joint will be surrounded by a collar or flange of solder protruding from the main wall-like body of solder and sealed to the cable sheath for some distance. Hence, even if the wall of solder is made relatively thin, yet an extended and rigid joint between such wall and the cable sheath is provided, ample to cover the windings 29, 30 and 31 and to withstand the forces to which the cables may be subjected, without danger of leakage along the cable sheath.

The gate or sprue cavity 37 is preferably formed at the location shown, so as to insure direct access of the solder to the conical space surrounding the cable even though the final amounts of solder may be introduced after the remainder of the solder in the mold is partially hardened according to the methods hereinafter explained. The resulting cast sprue will thus extend from the flange surrounding the cable, up along the outside face of the wall of solder to a point adjacent and just above the upper end edge of the sleeve. While the sprue in this position is not objectionable on the finished joint, it may be readily filed or cut away after completion of the joint if so desired.

After the mold sections have been applied as shown in Fig. 1, a gasket as at 38 may be forced into an annular space provided therefor, surrounding the cable sheath. This gasket may be formed of cork or other suitable material or composition, capable of withstanding the temperature of molten solder and preferably a somewhat yieldable material which may be pressed firmly into place to prevent passage of molten solder outwardly along the surfaces of the cable sheath during the formation of the seal. A composition of cork and synthetic rubber known in the trade as "Coprene" has been found satisfactory. To prevent leakage of solder at the edges of the sleeve 21, it may sometimes be found desirable to insert packing material such as asbestos wicking or lead floss into an annular space 39 provided therefor at the periphery of the mold.

The mold may now be heated preferably by internal electrical heating means hereinafter described. Small quantities of powdered stearin or other suitable flux as required, may be introduced through the mold gate and then the mold cavities may be filled through the gate with solder in solid state, but in such divided form that it may be substantially poured into the mold. Preferably this solder may take the form of wire solder cut into short pellets, or solder shot of somewhat less than $\frac{1}{8}$" diameter, although in some cases granulated solder may be used if desired. Grade 1, Class 1, solder shot comprised of 50% tin and 50% lead has been found satisfactory.

The introduction of the solder in the divided solid forms as above explained, is particularly advantageous in that none of the solder need be made molten until after it is in place within the joint and thus the hazards of maintaining a quantity of molten solder and handling same are eliminated, as are also the difficulties of timing the workman's motions to avoid applying or introducing the molten solder, either too hot or too cool. It may be observed that if molten solder were to be poured into the molds, two sources of heat would be necessary in practice, one for preliminarily melting the solder and the other to heat the molds. Otherwise the molten solder when poured into the mold gates might solidify on striking the cold parts and preclude proper soldering action or preventing filling of the mold. And if two sources of heat were thus used, the same could not be readily conjointly controlled and hence there would still be danger that the molten solder would enter the molds at too high a temperature and thus melt holes through the lead sleeve, barriers or cable sheaths. However, by introducing the solder in divided solid state, all of the heating may be readily accomplished by electrical means within the molds and under carefully controlled and safe conditions. Also the use of pellets or solder shot appears to offer the further advantage that when the same are being melted within the mold, they will abruptly and intermittently fall or slide over one another and over the surfaces to be soldered, in such a way that the surfaces will be mechanically smeared with the molten solder with a positive action, insuring firm adhesion of the solder to the sleeve, cable sheaths and barriers. That is, the mass of pellets or shot as initially introduced will have a great many interstices or air spaces and the melting solder, in falling into these spaces, will promote the action above referred to.

Figures 6, 8:
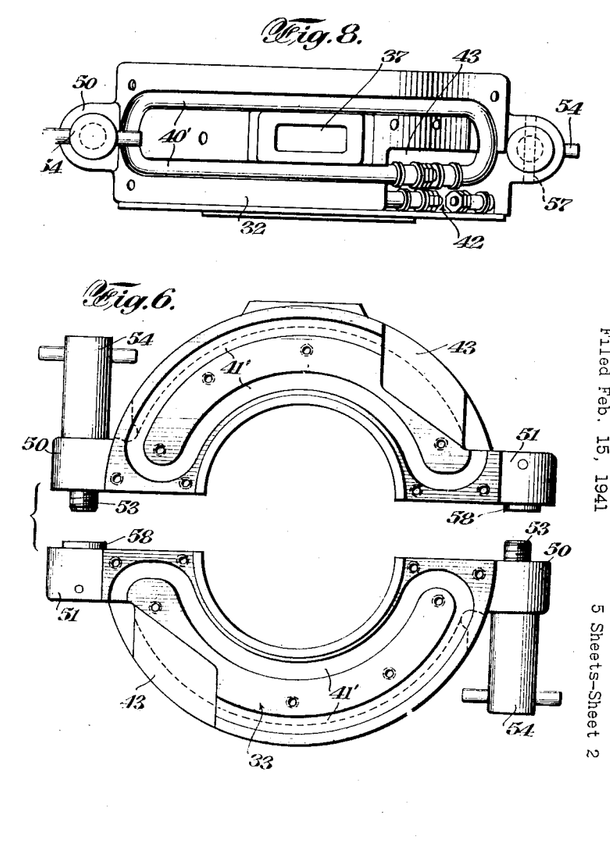
Fig. 6 is a face view of molding means such as of Fig. 3, but showing the mold parts in separated condition and with certain of the parts removed.
Fig. 8 is a top view of one of the mold parts of Fig. 6.

The electrical heating means for the mold sections may comprise resistance elements permanently embedded with refractory insulation in metallic tubes as at 40, 41 (Figs. 9 and 10) and of a type well-known per se, the same being formed or bent to the shapes shown whereby units as at 40 may be received in correspondingly shaped grooves 40' formed in the walls of each of the mold sections and units 41 may be received in correspondingly shaped grooves 41' of each mold section. The terminals for the resistance units of each mold section may be grouped together as at 42 (Figs. 3, 8) within a cavity as at 43 at the edge of the mold section. After the heating units 41 have been put in place, the same may be retained by cover plates as at 44 (Fig. 3). After the heating units 40 have been put in place, these may be retained by circumferentially extending covers as at 45 (Figs. 1, 3). Then after the terminal connections for the units have been made, such connections may be enclosed by terminal covers as at 46 (Fig. 3).

Figure 7:
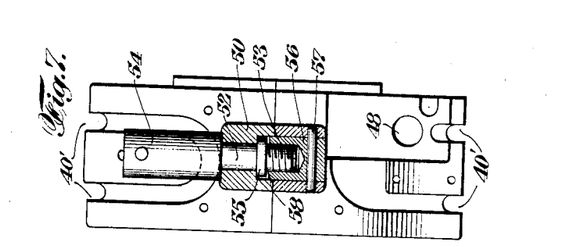
Fig. 7 is a side view partially in section showing further details of the mold of Fig. 6.
Figure 11:
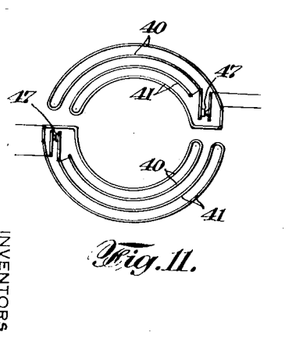
Fig. 11 is a circuit diagram illustrating preferred electrical connections for the heating elements as of Figs. 9 and 10.

A suitable diagram for the circuit connections to the heating units is shown by Fig. 11, indicating the units 40, 41, as being connected in parallel with one of the lead wires thereto, passing through a thermostat as at 47. These thermostats, one for each of the mold sections, may be of a suitable known enclosed type. If desired, cavities for enclosing same as at 48 (Figs. 1, 7) may be provided in each mold section so that the thermostats will form an integral part of the assembly of each section. These thermostats should be so made or adjusted that upon reaching a temperature sufficient to fully melt the particular solder composition used in the mold, the thermostat will act to disconnect the current to the heating units promptly before the temperature of the mold section is increased to a point where there would be danger of melting or softening the lead of the cable sheath, of the joint-enclosing sleeve 21 or the lead of the barrier 23. It has been found to be desirable and in some cases important to provide a thermostat to control the temperature of each of the mold sections individually, for several reasons. When the solder becomes molten in the mold cavities, considerable shrinkage of the mass will occur so that at times there will be a larger volume of the solder in the lower mold section than in the upper section, whereby the upper section may tend to become too hot before the lower section reaches a proper temperature. Also for various other reasons, differences may occur in the amount of heat required for the several mold sections or there may be minor differences in the heat radiation therefrom, rendering it advisable to separately control the temperatures of each section. Furthermore, after the solder becomes molten in the mold cavities, and has consequently shrunk, it will be necessary to add further solder preferably in solid form through the mold gate, to make up for the shrinkage. This added solder may be introduced in the form of solder rods or wire, or solder pellets, and consequently further heat will be required in the upper mold section to melt this added solder. After the mold cavities are entirely or nearly filled with molten solder, it is also desirable to shut off the current to the lower mold section first, in order to allow the lower part of the mass of the solder to solidify while the upper part is still molten, so that still further solid solder as required may be introduced and melted to make up for the shrinkage, while still controlling the upper mold temperature by its individual thermostat. In the more complicated forms of molds hereinafter described, as used for multi-cable joints, the various mold sections differ considerably in shape and volume of metal involved with consequent difficulties in accurately determining the heating capacity necessary for the resistance elements of each mold section. Consequently with these types of molds the use of a plurality of thermostats in different mold sections is desirable to insure that each section will be heated to the proper temperature to fully melt the solder without danger of melting the cable sheath or joint sleeve.

For clamping the mold sections together, the ends of each section may be formed with lugs as at 50, 51. The lugs 50 are adapted to rotatably receive manually operable clamping elements or studs 52 (Fig. 7) threaded at one end as at 53 and provided at their other ends with manually operable finger pieces as at 54. The studs 52 may be flanged as at 55 and such flange in connection with the piece 54 will serve to permanently retain the stud in rotatable position within the lug 50. This arrangement avoids the use of any loose clamping pieces separate from the mold sections, so that the use of the molds in confined underground work, for example, is facilitated without danger of loss of parts. The lugs 51 which oppose the lugs 50 are adapted to receive internally threaded bushing members as at 56 (Fig. 7) for threaded engagement with the threaded portions 53 on studs 52 when the mold sections are to be clamped together. The bushings 56 may be retained in the lugs 51 as by transverse pins as at 57. Bushings 56 are preferably so positioned in the lugs 51 that the ends of the bushings as at 58 will protrude beyond the parting line of the mold and thus serve to hold the mold sections in proper alignment when placed together and until the threaded clamping means is engaged and tightened. When the mold sections are to be unclamped and removed, the threaded portions on the studs 52 will bear against the threads 53 and thus act to pry apart the mold sections easily upon loosening the clamping screws.

The abutting faces of the mold sections are accurately finished to insure a close fit. In order that the mold sections may be good conductors of heat, while being light in weight for convenience use, they are preferably formed of aluminum alloy. Aluminum allow known as "No. 43" in the trade has proven satisfactory, and has substantially the following composition:

| | | |
|---|---|---|
| Aluminum | per cent minimum | 92.5 |
| Silicon | per cent | 4.5 to 6 |
| Copper | per cent maximum | 0.4 |
| Manganese | do | 0.2 |
| Magnesium | do | 0.02 |
| Iron | do | 0.8 |
| Zinc | do | 0.02 |
| All others | per cent maximum each | 0.2 |

The mold surfaces which contact with the solder may be suitably treated as by a so-called "anodizing" process to prevent the solder from adhering thereto.

The joint sleeve 21 may be provided with vents of conventional type, to be left open during the sealing operation, to relieve gas pressures which might otherwise occur within the joint due to heating of the ends thereof. After the seals have been formed at the ends of the joints, oil or other insulating liquid may be poured in and the vents sealed in the usual ways.

The modified embodiment of the barrier means as shown at 23' in Fig. 5a, may have a peripheral flange 26', which will act in the same manner as the flange 26 on the barrier of the form shown in Fig. 2. A similarly extensive inwardly protruding flange 28' is here shown embracing the sheath of cable 20'. This flange, like flange 26', is sufficiently extensive so that any molten solder which tends to run in between the flange and sleeve will become solidified and thus prevent leakage of solder inwardly of the joint. The flange 28' may be initially made somewhat conical if desired and then reamed or expanded as desired on the job to fit the particular cable sheath to which it is applied.

Figures 12, 14:
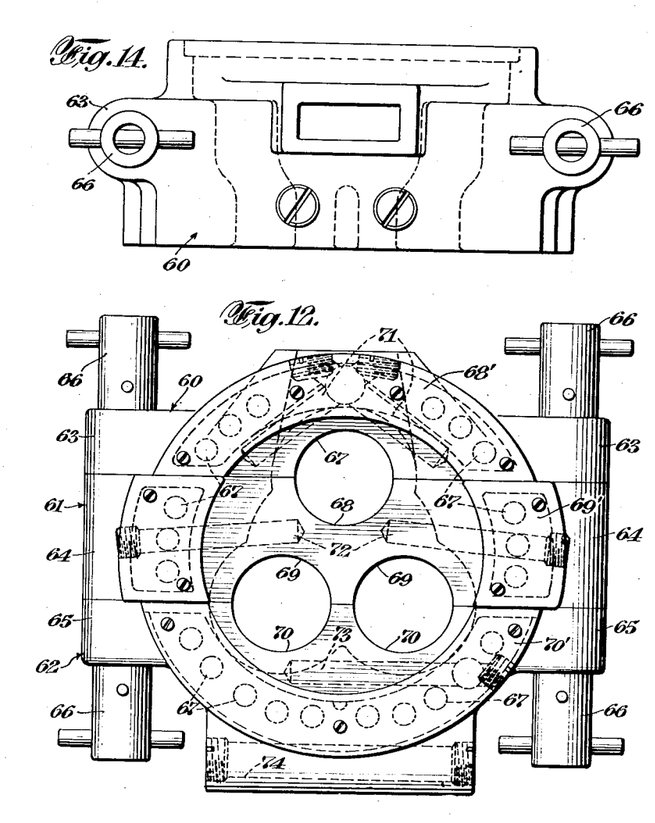
Figs. 12, 13 and 14 respectively are face, longitudinal sectional, and top views of an alternative form of mold construction adapted for use in connection with three cables of equal size entering a cable joint.
Figure 13:
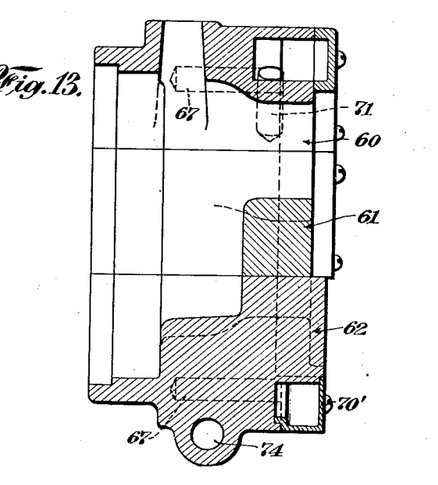

Figs. 12–14 inclusive illustrate a modified form of mold construction adapted for use in connection with three cables entering the cable joint. While in general this form of mold may be constructed in accordance with the principles adopted for the mold as above described, it will be observed that in this case the mold is formed of three complementary sections, i. e., a top section 60, a middle section 61 and a lower section 62, each section extending from side to side of the group of cables and terminating in lugs as at 63, 64, 65 adapted to be clamped together by suitable clamping means such as above described in connection with Figs. 6 and 7, manually operable by finger pieces as at 66. In this case it will be noted that the upper mold section may be formed with a single semi-circular cut-out portion as at 67, which together with a complementary cut-out portion 68 on mold section 64, provides means for embracing the sheath of the uppermost of the three cables. At the parting line between the middle and lower sections of the mold, two cut-out portions as at 69, 70 may be provided on each mold section respectively for similarly engaging the two lowermost of the three cables.

Figure 9:
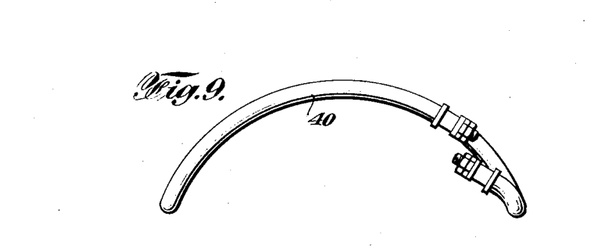
Figs. 9 and 10 show forms of electrical resistance heating elements which may be used in the mold of Figs. 6-8.
Figure 10:
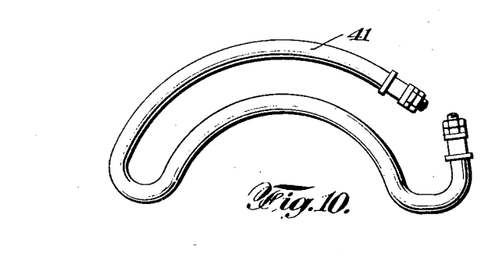

Instead of heating units of the type shown in Figs. 9 and 10, the mold of Figs. 12–14 may be heated by cartridge type heaters of suitable known construction adapted respectively to slide into apertures as at 67 formed at suitably spaced points around the peripheral portion of each mold section. The cartridge heaters for each mold section may be suitably connected in parallel and after the connections are made, the same may be covered as by cover plates 68', 69', 70'. In order to insure proper heating of the gate portion of this mold, additional cartridge heaters may be inserted in cavities provided as at 71. If desired, the heaters in these latter cavities may be independently connected to the source of current, and thus may be kept connected after all the others are disconnected and thereby keeping the solder at the gate or sprue in molten condition after the remainder has hardened. This will make it possible to introduce and melt added amounts of solid solder to compensate for the final shrinkage. In order to insure proper heating of the area between the three cables, the middle section of the mold may be formed with an additional cavity or cavities as at 72. Similarly, to insure proper heating of the space between and below the two lower cables, an additional cartridge heater cavity as at 73 may be provided in the lower mold section. A cavity or cavities for the heat control thermostate, may be provided at suitable points, such as along the lower edge of the lower mold section as indicated at 74.

The use of the cartridge type heaters as above described is particularly desirable in certain cases, such as for irregularly shaped multi-cable molds where it might prove difficult to properly shape and insert heaters of the type shown in Figs. 9 and 10.

Figure 15:
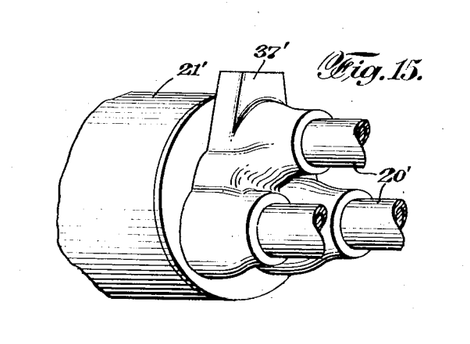
Fig. 15 is a perspective view of a completed sealed end portion of a cable joint as formed with the molding means of Figs. 12-14.

Fig. 15 is a perspective view of the finished sealed end of a cable joint of the type which may be formed with the mold as of Figs. 12–14. Here it will be noted that each of the cable sheaths is surrounder and sealed in respect to a flange-like mass of solder, each of such masses being of generally conical form with the bases thereof bulging outwardly and integrally joined, thus greatly strengthening the portions of the solder seal through which the cables pass and serving to firmly hold the cables in their desired relative positions as they enter the joint.

Figure 16:
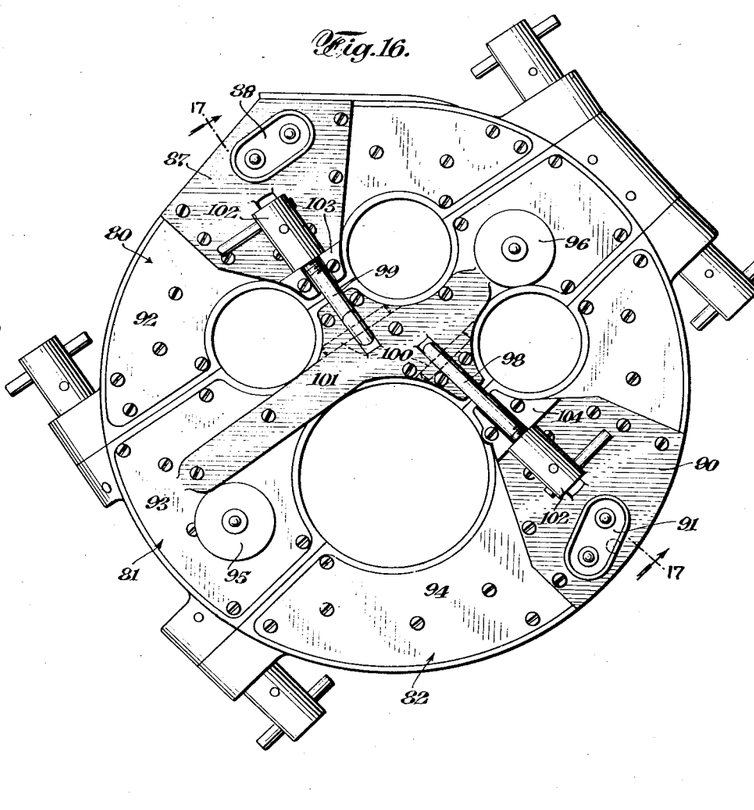
Fig. 16 is a face view of an alternative form of mold adapted for sealing four entering cables in respect to a joint.
Figure 17:
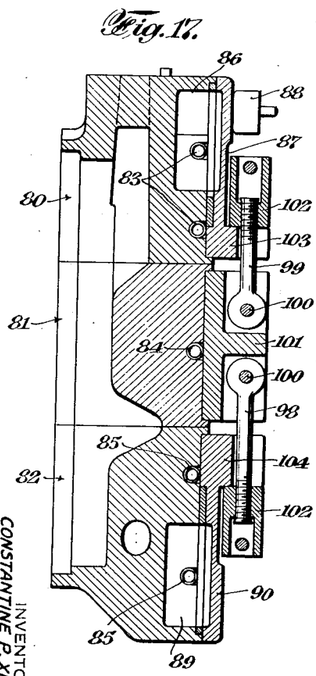
Fig. 17 is a sectional view taken substantially along the line 17—17 of Fig. 16.
Figure 18:
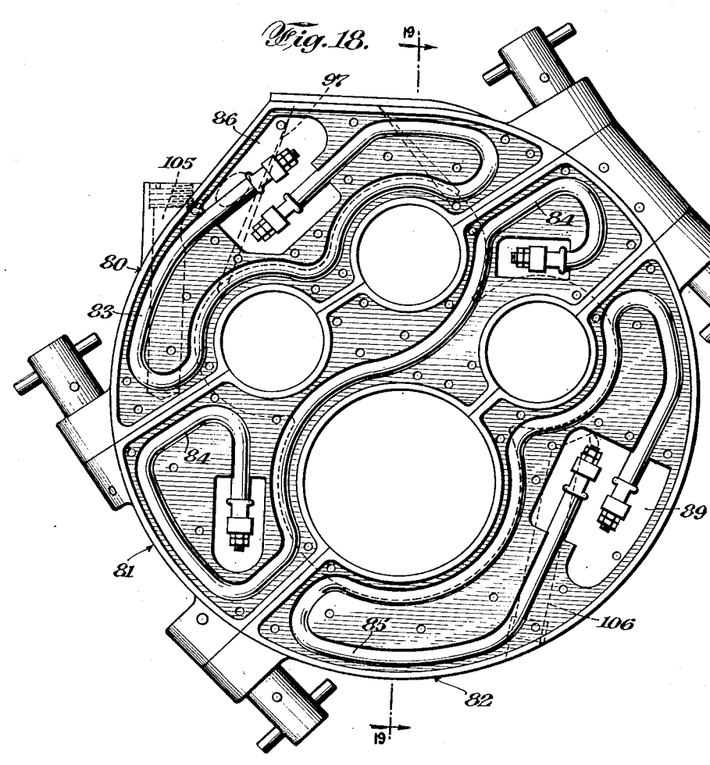
Fig. 18 is a view similar to Fig. 16, but with certain of the mold parts removed to show the arrangement of heating elements therein.
Figure 19:
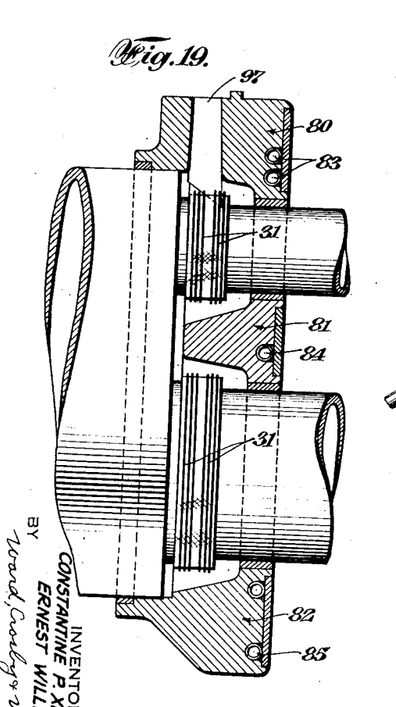
Fig. 19 is a sectional view taken substantially along the line 19—19 of Fig. 18 and showing this mold as applied to a cable joint or terminal end portion.

In Figs. 16–19 inclusive, a further form of mold is illustrated, of a type adapted for use in connection with four cables, which as indicated may be of two or more different sizes. This mold may comprise three sections as at 80, 81, 82 adapted to be clamped together and otherwise used in a manner apparent from the above descriptions of the other molds, and as shown in Fig. 19. The manner in which these sections embrace the several cables will be apparent from Fig. 18 which also shows a preferred form and arrangement of the heating elements 83, 84 and 85 for the three mold sections respectively. As shown, the terminals of the heating element 83 may be located adjacent each other in a cavity 86 adapted to be covered by cover plate 87 (Fig. 16), this cover plate being equipped with a quick-detachable terminal plug as shown at 88. Similarly in mold section 82 the heating element terminals may be positioned in a cavity 89 provided with a cover plate 90 and a quick-detachable plug connection as at 91. As shown in Fig. 16, the several heating elements may be covered by removable plates as at 92, 93, 94. Quick-detachable plug connections may be provided as at 95, 96 on the plate 93 for the heating unit 84 of the central mold section. As shown in Figs. 18 and 19, the gate or sprue 97 may open into the cavities in the mold for forming the flanges surrounding the two upper cables.

In some cases with large molds, it may be desirable to supplement the clamping means at the ends of the mold sections with additional clamping means at intermediate points on the sections. That is, the body of molten solder within a large mold has considerable weight and the solder may tend to leak out along the mid portions of the parting lines between the mold sections if the sections are not further clamped at intermediate points. Such additional clamping means are shown in Figs. 16 and 17 and may include eyebolts as at 98, 99 having their eyelets pivotally connected by pins as at 100 to a strengthening boss portion 101 formed on cover plate 93, for example. The outer ends of the bolts 98, 99 may be threaded and provided with internally threaded finger pieces as at 102 adapted to releasably engage boss portions as at 103, and 104 formed on cover members 87 and 90 respectively.

As indicated in Fig. 18, a cavity 105 may be provided for a thermostat within the upper mold section and similarly a thermostat cavity 106 may be provided in the lower mold section, these cavities communicating respectively with the terminal spaces 86 and 89.

With the methods and constructions above described, it has been found that workmen, even with little experience, are able to reliably seal complicated and large sized splices in a fraction of the time required for the usual wiping process. At the same time the workmen are not subjected to the hazards of working around or with open masses of molten solder. There is never any necessity of incurring the hazard of using an open flame underground either to glaze the joint or for any other purpose, and there is no danger of spilling the solder onto the workman, and there is no loss from pouring excess solder, as occurs with the wiping method.

Pressure tests made on joints completed in accordance with this invention and under practical conditions in the field, show that with both high and low voltage cable systems, reliable seals may be produced with a high degree of uniformity, dependability and certainty.

Since the heat is applied electrically while the solder is in place, the amount of heat may be accurately controlled, and skillful timing of the motions of the operatives as necessary in pouring and wiping is obviated. The time and skilled labor required for properly "beating in" and fitting the sleeve ends and parts, for wiped joints are obviated, as are also the uncertainties and defects of such method.

While we are aware that attempts have heretofore been made to seal cable joints by the use of molds for casting solder for the purpose, these attempts so far as we are aware did not obviate the necessity of "beating in" and specially fitting the ends of the joint sleeve. Neither were the molds of such form that the solder could be introduced in divided solid state and then be heated under controlled conditions to overcome the numerous difficulties of the "wiping" method.

In practising this invention the solder composition used may be selected without adhering to the requirements for obtaining a plastic mixture. Yet the resulting cast walls of solder are substantially homogeneous throughout, and the porosity encountered in hand formed wipes is eliminated. The solder mixture remains essentially constant as it is retained in the casting cavity.

Since a definite plastic range is not required of the solder for this method, it is possible if desired to choose a solder mixture close to the eutectic, thereby requiring less heat for melting, with less chance of injury to the cable insulation.

If at any subsequent time, it is desired to open the joint, the molds may be put in place again and sufficient heat thereby applied to readily melt down the solder seals without injury to the lead cable sheaths or the lead sleeve, whereupon the sleeves may be slid away and the splice inspected or renewed or readily replaced by a splice with additional or larger cables, for example. Then the joint may be sealed again as before. Or if a larger joint is necessary, the sleeves may be removed for reuse elsewhere and larger sleeves, barriers, etc., may be substituted.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. A mold for casting a solder seal between the end of a cable joint sleeve and a cable sheath extending therein, comprising a plurality of complementary mold sections each having a semicircular recess for embracing one side of a cable sheath and each section extending generally radially outwardly from such recess to a peripheral portion adapted to embrace a portion of the sleeve edge, means for removably clamping said sections in respect to each other and to the sheath and sleeve, and arcuately extending electrical resistance heating elements embedded within the walls of each of said mold sections along regions intermediate between the portions which embrace the cable sheath and the sleeve.

2. A mold for casting a solder seal between the end of a cable joint sleeve and a cable sheath extending therein, comprising a plurality of complementary mold sections each having a semicircular recess for embracing one side of a cable sheath and each section extending generally radially outwardly from such recess to a peripheral portion adapted to embrace a portion of the sleeve edge, a sprue opening formed wholly within one of said sections, means for removably clamping said sections in respect to each other and to the sheath and sleeve, electrical heating means within the walls of each of said mold sections, and electrical connections for applying heating current to the section having the sprue opening while the other section or sections are allowed to cool.

3. A mold for casting a solder seal between the end of a cable joint sleeve and a cable sheath extending therein, comprising a plurality of complementary mold sections each having a semicircular recess for embracing one side of a cable sheath and each section extending generally radially outwardly from such recess to a peripheral portion adapted to embrace a portion of the sleeve edge, means for removably clamping said sections in respect to each other and to the sheath and sleeve, electrical heating means within the walls of each of said mold sections, and thermostatic means within at least one of said sections for controlling the heating current therefor.

4. A mold for casting a solder seal between the end of a cable joint sleeve and a cable sheath extending therein, comprising a plurality of complementary mold sections each having a semicircular recess for embracing one side of a cable sheath and each section extending generally radially outwardly from such recess to a peripheral portion adapted to embrace a portion of the sleeve edge, means for removably clamping said sections in respect to each other and to the sheath and sleeve, electrical heating means within the walls of each of said mold sections, and thermostatic means within each of said sections for independently controlling the heating current for each section, to limit the temperature of each section to a predetermined value.

5. A mold for casting a solder seal between the end of a cable joint sleeve and a cable sheath extending therein, comprising a plurality of complementary mold sections each having a semicircular recess for embracing one side of a cable sheath and each section extending generally radially outwardly from such recess to a peripheral portion adapted to embrace a portion of the sleeve edge, means for removably clamping said sections in respect to each other and to the sheath and sleeve, and a plurality of recesses formed in each of said sections for removably receiving cartridge-like electrical heating elements, said recesses extending, from points spaced around the cable sheath, into the mold sections in directions toward the end of the sleeve and generally parallel to the sleeve axis.

6. A mold for casting a solder seal between the end of a cable joint sleeve and the sheaths of a plurality of cables extending therein, comprising a plurality of complementary mold sections each having one or more semi-circular recesses for partially embracing one or more cable sheaths and the adjacent sections having a complementary recess or recesses, each section extending generally radially outwardly from such recesses to a peripheral portion or portions adapted to embrace a portion of the sleeve edge, means for removably clamping said sections in respect to each other and to the sheath and sleeve, a plurality of recesses being formed in the peripheral portions of each of said sections for receiving electrical heating elements, and one or more additional heating element recesses extending into the portion of the mold between the cables.

7. A mold for casting a solder seal between the end of a cable joint sleeve and three or more cable sheaths extending into such sleeve, comprising at least three complementary mold sections extending from side-to-side of the group of cables, each section having a lug protruding to each side, the several lugs at each side being superimposed, means for removably clamping together the superimposed group of lugs at each side, each of said sections having one or more semi-circular recesses for partially embracing one or more cable sheaths and the adjacent sections having a complementary recess or recesses, and each section extending generally radially outwardly from the recessed portions to a peripheral portion or portions adapted to embrace the sleeve edge, said clamping means also serving to clamp the sections in respect to the cable sheaths and to the sleeve.

8. A mold for casting a solder seal between the end of a cable joint sleeve and three or more cable sheaths extending into such sleeve, comprising at least three complementary mold sections extending from side-to-side of the group of cables, each section having a lug protruding to each side, the several lugs at each side being superimposed, means for removably clamping together the superimposed group of lugs at each side, and additional means located at intermediate points along the parting lines of the mold sections, for releasably clamping adjacent sections together at such points, each of said sections having one or more semi-circular recesses for partially embracing one or more cable sheaths and the adjacent sections having a complementary recess or recesses, and each section extending generally radially outwardly from the recessed portions to a peripheral portion or portions adapted to embrace the sleeve edge.

9. Molding means for casting a solder seal between the end of a cable joint sleeve and a cable sheath extending therein in spaced relation to the end edges of the sleeve, comprising a sheet metal barrier means for engaging at its periphery the inside walls of the sleeve, an annular flange portion protruding from the barrier outwardly of the joint for embracing the cable sheath and adapted to be encircled by windings retaining same in sealing relation to the sheath against passage of molten solder into the joint, and a plurality of removable and complementary mold sections for embracing the sheath at points outside said barrier means and spaced therefrom and for extending to and embracing the sleeve edges.

10. Molding means for casting a solder seal between the end of a cable joint sleeve and a cable sheath extending therein in spaced relation to the end edges of the sleeve, comprising a sheet metal barrier means for engaging at its periphery the inside walls of the sleeve, an annular and generally conical flange portion of ductile metal protruding from the barrier outwardly of the joint for embracing the cable sheath, and a plurality of removable and complementary mold sections for embracing the sheath at points outside said barrier means and spaced therefrom and for extending to and embracing the sleeve edges, said sections as assembled having a generally conical cavity into which said flange portion may protrude in spaced relation to the walls of the cavity.

11. A mold for casting a solder seal between the end of a cable joint sleeve and the sheaths of a plurality of cables extending therein, comprising a plurality of complementary mold sections each having one or more semi-circular recesses for partially embracing one or more cable sheaths and the adjacent sections having a complementary recess or recesses, each section extending generally radially outwardly from such recesses to a peripheral portion or portions adapted to embrace a portion of the sleeve edge, means for removably clamping said sections in respect to each other and to the sheath and sleeve, the mold sections being formed to provide generally conical cavities surrounding each cable, such cavities for adjacent cables merging into one another at their portions of largest diameter, the mold thus being constructed and arranged to provide a wall-like mass of solder for sealing the end of the sleeve, with integral merging flanges of solder protruding from the wall and surrounding each cable sheath.

12. A mold for casting a solder seal between the end of a cable joint sleeve and a cable sheath extending therein in spaced relation to the end edges of the sleeve, comprising a plurality of complementary mold sections each having a semi-circular recess for embracing one side of a cable sheath and each section extending generally radially outwardly from such recess to a peripheral portion adapted to embrace a portion of the sleeve edge, means for removably clamping said sections in respect to each other and to the sheath and sleeve, and electrical heating means within the walls of each of said mold sections, said mold sections being formed of a hard cast aluminum alloy with the surfaces thereof which contact with the solder, treated by anodizing.

ERNEST WILLIAMS.
CONSTANTINE P. XENIS.